Oct. 22, 1929.　　　F. A. SMITH　　　1,733,031
CLARIFYING APPARATUS
Filed Nov. 9, 1928　　　3 Sheets-Sheet 2

F. A. Smith, INVENTOR
BY Victor J. Evans
ATTORNEY

Oct. 22, 1929.  F. A. SMITH  1,733,031
CLARIFYING APPARATUS
Filed Nov. 9, 1928  3 Sheets-Sheet 3

F. A. Smith, INVENTOR
BY Victor J. Evans
ATTORNEY

Patented Oct. 22, 1929

1,733,031

UNITED STATES PATENT OFFICE

FREDERICK A. SMITH, OF LEXINGTON, VIRGINIA

CLARIFYING APPARATUS

Application filed November 9, 1928. Serial No. 318,249.

This invention relates to clarifying apparatus for clarifying and purifying solutions used in dry cleaning establishments, an object being to provide an apparatus for this purpose by means of which the cleaning fluid after used in the cleaning room may be passed through the apparatus and thoroughly clarified and purified and returned to the cleaning room for reuse.

Another object of the invention is the provision of a novel form of clarifier and purifier having means for mixing the cleaning fluid with the clarifying and purifying solution, so that the cleaning fluid will be separated from heavier foreign matter and carried to a filter for final purification, and thereafter returned to the cleaning room, or to a storage tank.

With the above and other objects in view, the invention further includes the following novel features and details of construction, to be hereinafter more fully described, illustrated in the accompanying drawings and pointed out in the appended claims.

In the drawings:—

Figure 2:
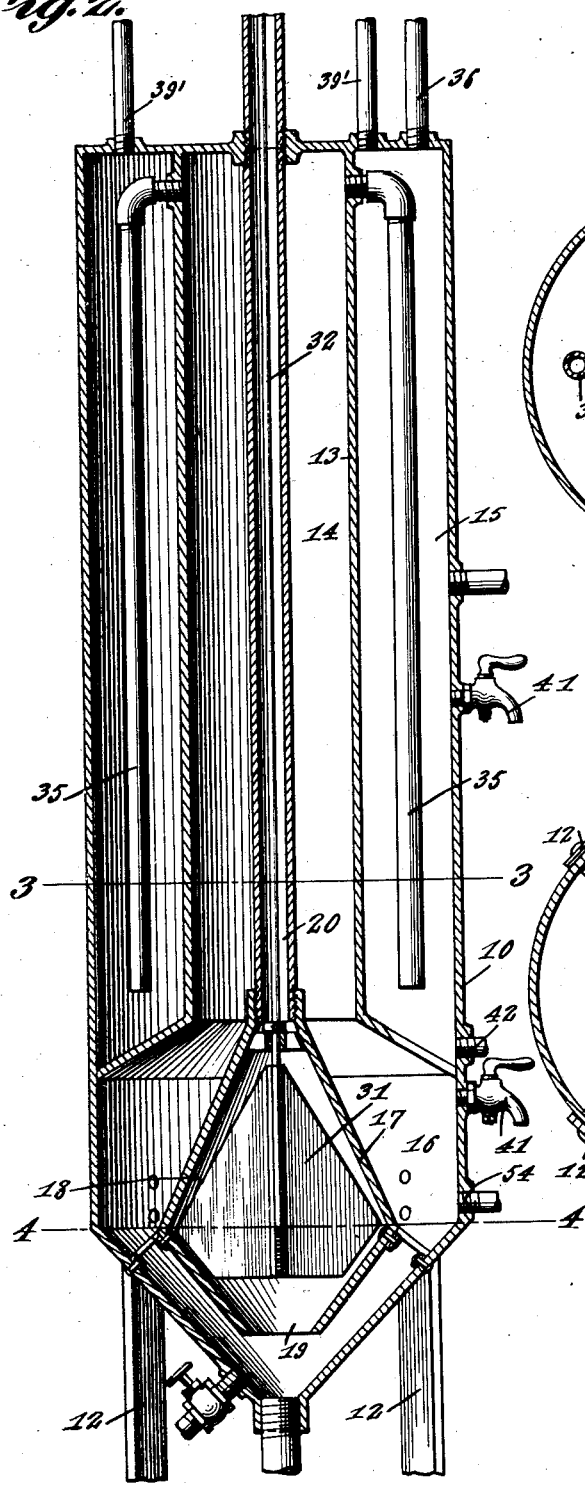
Figure 2 is a vertical sectional view through the clarifying tank.
Figure 3:
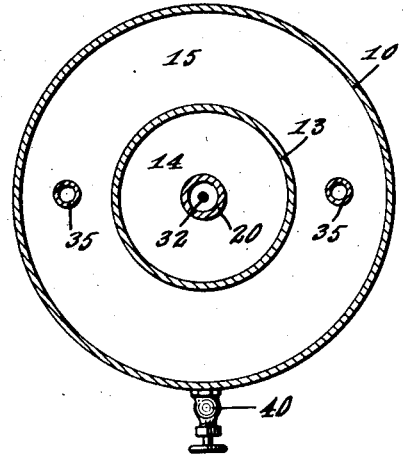
Figure 4:
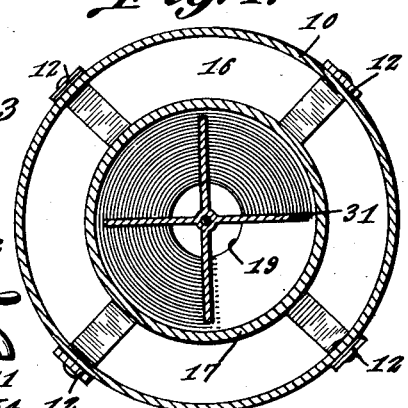

Figures 3 and 4 are sectional views taken respectively on the lines 3—3 and 4—4 of Figure 2.

Figure 5:
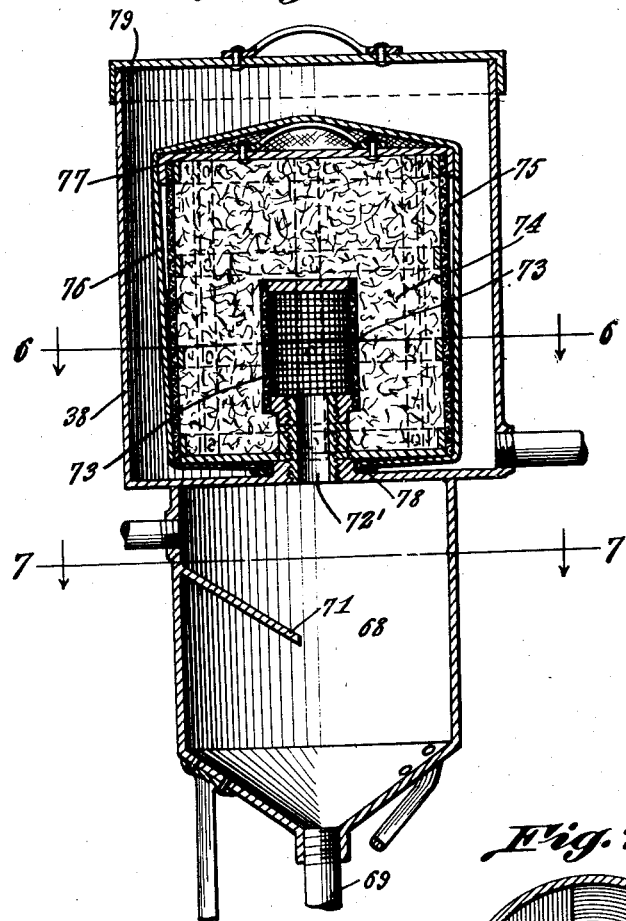

Figure 5 is an enlarged vertical sectional view through the filter.

Figure 6:
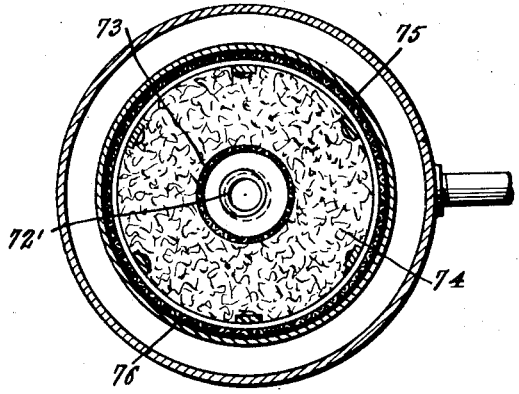
Figure 7:
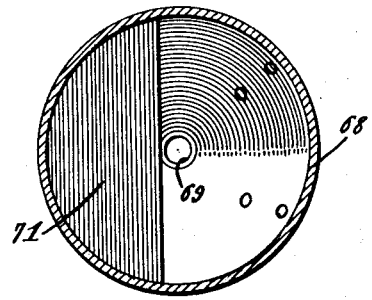

Figures 6 and 7 are sectional views taken respectively on the lines 6—6 and 7—7 of Figure 5.

Referring to the drawings in detail wherein like characters of reference denote corresponding parts, the apparatus as shown comprises a clarifying tank 10 and a purifying tank 11, both of which are of like construction and shown in detail in Figure 2 of the drawings. As shown, these tanks are mounted upon suitable supports 12 and are divided by means of a partition 13 into an inner chamber 14 and an outer chamber 15. The lower end of the inner chamber 14 is enlarged to provide a solution chamber 16 within which is positioned what may be termed a "trap funnel" 17. This funnel encloses a mixing chamber 18 which is open at its lower end as shown at 19, while its upper end communicates with a pipe 20.

Figure 1:
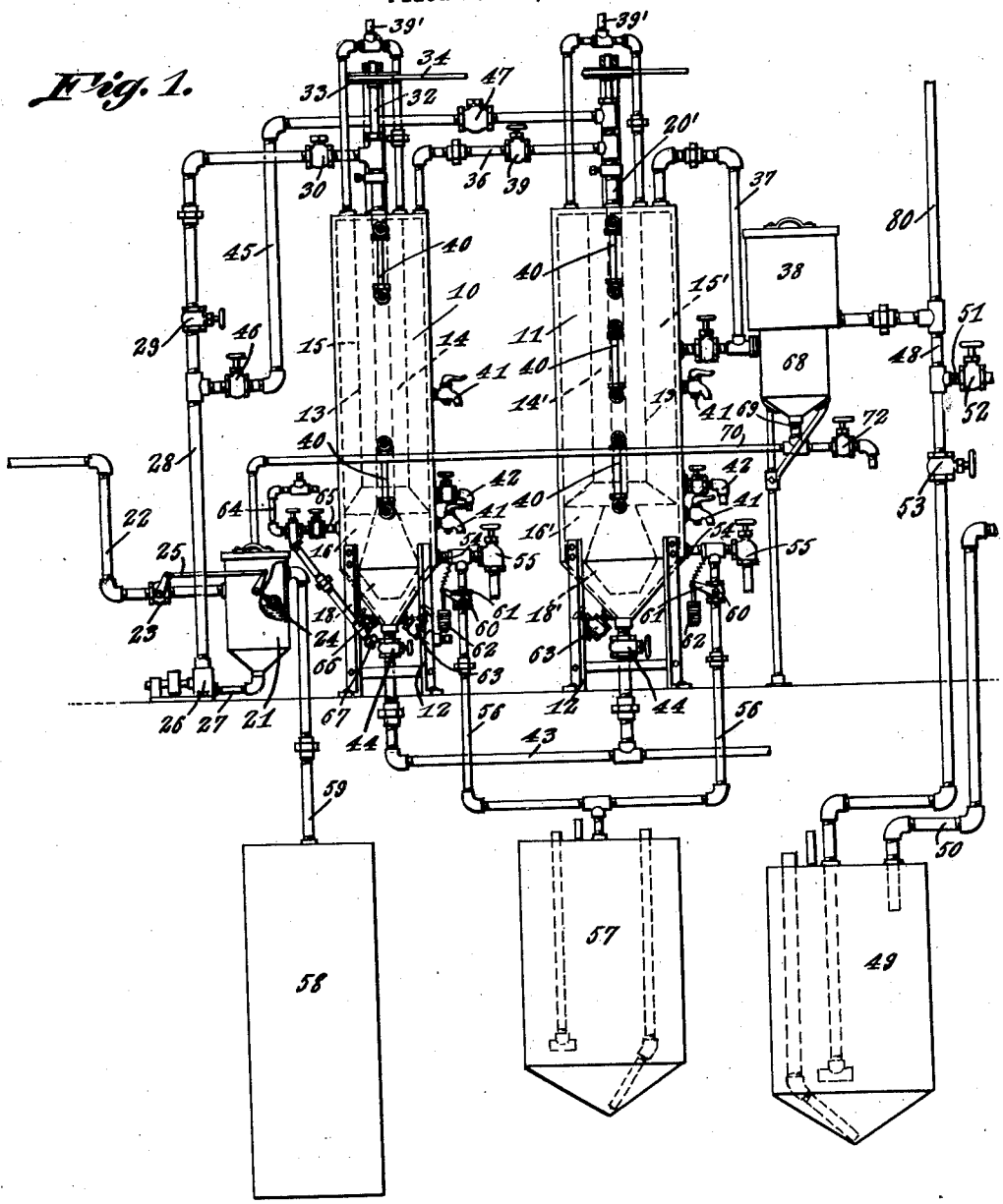
Figure 1 is an elevation of a clarifying apparatus constructed in accordance with the invention.

For the purpose of description, the inner chamber of the purifying tank 11 will be indicated at 14' in Figure 1 while the outer chamber will be indicated at 15'. The solution chamber will be indicated at 16' and the mixing chamber at 18'.

The invention further includes a fluid feed tank 21 which is adapted to receive the fluid to be clarified and for this purpose a pipe 22 extends to the tank 21 from a pump or other source of power to force the fluid from the cleaning room. This pipe 22 is controlled by a valve 23 and the latter is actuated by means of a float 24 located within the tank and operatively connected with the valve through a connecting rod 25.

The bottom of the tank 21 is in communication with a rotary pump 26 through a pipe 27 so that fluid from the tank 21 will be forced upward by the pump 26 through a pipe 28 within which is positioned a valve 29. The pipe 28 communicates with the upper end of the pipe 20 of the clarifying tank 10 and is provided with a check valve 30.

The fluid passes through the pipe 20 into the mixing chamber 18 and located within this chamber is a rotary mixer 31 which is carried at the lower end of a shaft 32, the latter extending downwardly through the pipe 20 and having mounted upon its upper end a pulley 33 which is driven by a belt 34 from a suitable source of power. The cleaning fluid is thus thoroughly mixed within the chamber 18 with a solution in the solution chamber 16, passing outward from the mixing chamber 18 through the opening 19 and through the solution in the chamber 16. The fluid then passes upward through the inner chamber 14 and out of this chamber through pipes 35, from which it empties into the bottom of the outer chamber 15. The fluid passes upward through the outer chamber and outward through a pipe 36 and enters a pipe 20' which extends downward into the inner chamber 14' of the purifying tank 11. The operation just described in connection with the clarifying tank is repeated within the purifying tank, the fluid passing out of the purifying tank through a pipe 37 into a filter 38. The pipe 36 is provided with a valve 39 to interrupt communication between the tanks 10 and 11 when desired. The rotary mixer within the purifying tank 11 is operated by a pulley 33' and belt 34', after the manner of the mixer 31 in the clarifying tank.

Each of the tanks 10 and 11 is provided with a vent pipe 39, while sight gauges 40 are also provided for determining the condition of the fluid. In addition, the tanks are provided with testing faucets 41 and with muck drains 42. The lower ends of the tanks 10 and 11 are further provided with pipes 43 which may extend to a sewer and these pipes are controlled by valves 44 for the purpose of draining the tanks of muck.

A branch pipe 45 connects the pipe 28 with the pipe 20' and this pipe is provided with a valve 46, whereby a suitable purifying solution may be fed to the tank 11. The pipe 45 is also provided with a check valve 47 and when this pipe is in use, the valve 46 is opened and other valves are closed. At other times, the valve 46 remains closed.

After the solution passes through the filter it enters a pipe 48 and may pass through this pipe to an underground tank 49 from where it may be returned to the washer in the cleaning room through a pipe 50, or it may be returned directly to the washer in the cleaning room through a pipe 51 which is controlled by a valve 52. A valve 53 controls the pipe 48. The tank 49 is adapted to be placed underground for storing the reclaimed cleaning fluid.

The tanks 10 and 11 have extending therefrom pipes 54 to which are connected drain controlled valves 55 for detaining off high muck. These pipes 54 are connected by a pipe 56 with a fire emergency tank 57 which may be buried in the ground, while a dump tank 58 connects with the tank 21 through a pipe 59. The pipes 58 are provided with valves 60 which are held in closed position by means of a fusible link 61 and are opened by weights 62, so that as soon as the links 61 are fused by heat the valves to the fire emergency tank 57 will be quickly opened.

The tanks are further provided with muck drain valves 63, while the tank 11 is provided with a steam or water connection 64 having a branch 65 which communicates with the upper portion of the solution chamber 16 and a branch 66 which communicates with the lower portion. A drain cock 67 is provided in the lower end of this pipe.

When the purified solution leaves the tank 11 it enters the filter 38 as previously mentioned, the fluid entering a water trap 68 provided in the filter. The bottom of this trap is inclined and communicates by means of a short pipe 69 with a pipe 70, the latter providing a return pipe to the tank 21. The pipe 70 is also provided with an outlet valve 72.

The water trap 68 of the filter 38 is provided with an inclined deflector 71 and a cleaning fluid passes upward from this trap through a passage 72 and through a screen filter 73 which is surrounded by cotton waste or other suitable material 74. The fluid passes through this waste and through a screen 75 which surrounds the waste and also through a fabric sack 76. The screen 75 is provided with a removable cover 77 while the sack extends over this cover downward around the screen 75 and has its mouth 78 drawn together around the walls of the passage 72. The housing of the filter 38 is provided with a removable cover 79. The pipe 48 is provided with a vent pipe 80.

The invention is susceptible of various changes in its form, proportions and minor details of construction and the right is hereinreserved to make such changes as properly fall within the scope of the appended claims.

Having described the invention what is claimed is:—

1. In a liquid clarifying apparatus, a clarifying tank, means to force the liquid to be clarified into the tank, means controlled by the liquid to control the feed of the latter, a purifying tank in communication with the clarifying tank and adapted to receive liquid from the latter, a filter to receive the liquid from the purifying tank, an emergency tank having communication with both the clarifying and purifying tanks, and fusible means to control the flow of liquid from the clarifying and purifying tanks to the emergency tank.

2. In a clarifying apparatus, a tank, an inner chamber and an outer chamber within said tank, a solution chamber communicating with the inner chamber and adapted to contain a clarifying solution, a mixing chamber within and communicating with the solution chamber to mix the liquid and clarifying solution and permit the former to pass through said solution into the inner chamber, means to deliver the liquid from the top of the inner chamber to the bottom of the outer chamber, and an outlet at the top of the inner chamber.

3. In a clarifying apparatus, a tank, an inner chamber and an outer chamber within said tank, a solution chamber communicating with the inner chamber and adapted to contain a clarifying solution, a mixing chamber within and communicating with the solution chamber to mix the liquid and clarifying solution and permit the former to pass through said solution into the inner chamber, a rotary mixer within the mixing chamber, means to deliver the liquid from the top of the inner chamber to the bottom of the outer chamber, and an outlet at the top of the inner chamber.

4. In a clarifying apparatus, a tank, an inner chamber, an outer chamber within said tank, a solution chamber communicating with the inner chamber and adapted to contain a clarifying solution, a mixing chamber within and communicating with the solution chamber to mix the liquid and clarifying solution and permit the former to pass through said solution into the inner chamber, a supply pipe extending through the inner chamber, and having its lower end communicating with the mixing chamber, a rotary mixer within the mixing chamber, a rotatable shaft extending through the supply pipe and connected to the mixer whereby the latter may be operated, means to deliver the liquid from the top of the inner chamber to the bottom of the outer chamber, and an outlet at the top of the inner chamber.

In testimony whereof I affix my signature.

FREDERICK A. SMITH.